Oct. 24, 1950     T. A. ST. CLAIR     2,527,381

RELIEF VALVE

Filed Nov. 5, 1948

INVENTOR.
THEODORE A. ST. CLAIR
BY Richey & Watts
ATTORNEYS

Patented Oct. 24, 1950

2,527,381

UNITED STATES PATENT OFFICE 2,527,381

RELIEF VALVE

Theodore A. St. Clair, South Euclid, Ohio, assignor to The Weatherhead Company, Cleveland, Ohio, a corporation of Ohio Application November 5, 1948, Serial No. 58,563

6 Claims. (Cl. 137—53)

This invention relates to pressure relief valves, and is particularly directed to pressure relief or safety valves employed in installations containing gases such as liquefied petroleum gas or other explosive or poisonous gases, the escape of small amounts of which might be dangerous.

Valves designed for the aforesaid type of service generally employ a soft seat or sealing member in order to insure the provision of a perfect seal and completely prevent all escape of gases under pressure through the relief valve except when the same opens due to excess pressure.

In many installations, such as liquefied petroleum gas storage systems, requirements are relatively severe as to the maintenance of the opening pressure at the specified value. With conventional valves having soft seats which receive the full load of the calibrated closing spring when the valve is closed, the characteristics of the valve may change between the time it is set at the factory and the time when it is subjected in actual service to the set pressure.

The aforesaid change in a conventional valve is caused by excessive stresses in the soft seat when operated at pressures below the pressure setting, because in such valves, as the valve pressure decreases the unit loading on the soft seat increases. For example, in certain widely used systems the pressure setting is approximately four times the normal operating pressure. At normal operating pressures, the excess spring load is absorbed entirely by the soft seat. Since for proper initial seal at setting pressure the annular area of the nozzle must be approximately ⅕ of the area of the nozzle, the soft seat will be loaded by approximately 20 times the normal operating pressure.

It is an important object of the present invention to eliminate these excessive stresses imposed upon the soft seat in normal operation by making the sealing force a direct function of the pressure to be sealed. The soft sealing member is annular and is lifted from the rigid valve seat by a pair of annular rigid members, one surrounding the valve seat and the other disposed within the valve seat. Stop means are provided between the movable and fixed valve elements and arranged so that deformation of the soft or rubber-like sealing member under spring pressure is limited to a predetermined and precisely controlled value, considerably less than the entire spring load. With the aforesaid structure there is no tendency for pressure in the system to blow the rubber-like sealing member out of its normal position when the valve opens. The sealing force is made proportional to the pressure by forming the rigid and rubber-like sealing portions of the movable valve member so that they cooperate to form a pressure chamber or clearance space above the nozzle. In this construction the spring may be adjusted for a given opening pressure and the stop means arranged so that relatively small initial deformation of the rubber seal is effected by the hard seat of the nozzle. Thus, although the rubber seal does not carry the entire spring load, the valve does not leak as pressure rises because pressure also increases in the clearance above the rubber sealing member, and the average load on the rubber seal during service is considerably less than with a valve wherein the seal is continuously subjected to the maximum load represented by the spring force. Another advantage of this construction resides in the fact that it permits the use of softer materials for the soft seal than could be employed for the same service with prior devices.

As mentioned, the effective differential area above the rubber seal is preferably somewhat greater than that below it to provide a gradually increasing sealing force. In the preferred form, the differential area substantially equals the area of the hard seat which area is considerably less than the area of the throat of the valve. The parts are preferably arranged so that the rubber under this differential pressure acts as a column and is pressed by said pressure against said seat. It is an important feature of the invention that any tendency of the rubber to flow or to be further deformed against the lip due to the aforesaid sealing pressure is resisted by the pressure of fluid surrounding that portion of the rubber-like seal which is not confined by the rigid valve member. The aforesaid pressure opposes any increase in volume or extension of the seal which might cause rubber to flow to the aforesaid pressure area. Thus, even though the sealing pressure against the valve seat increases as the system pressure increases, the deformation of the valve by the seat remains substantially constant and the effective area subject to opening pressure does not decrease. As a result the opening pressure of the valve remains constant and equals that for which the valve was originally set or adjusted.

Another object of the invention is to cause the closing pressure to closely approach the opening pressure. In prior constructions, this is difficult to obtain because of the tendency for the effective area within the valve throat to decrease over a period of time. After such valves open, upon reclosing the effective area subjected to pressure in the valve has increased, the result being that the pressure at which the valve closes is considerably lower than the pressure at which it opened.

As explained previously, these undesirable characteristics are not present in a valve having applicant's mode of operation, and applicant further decreases the variations between opening and closing pressures by causing the opening pressure to be trapped by the sealing member in the clearance space above it. Said trapped pressure causes said sealing member to bulge slightly and approach its seat, it being understood that the area immediately over the seat is at a lower pressure than the static pressure due to the high velocity of the fluid as it flows past the seat. In applicant's valve, the pressure-deformed sealing member is in a position to engage its seat sooner than in prior constructions, so that the closing pressure may closely approach or even equal the opening pressure.

The manner in which the aforesaid objects and advantages are accomplished will be more clearly understood from the following detailed description of a preferred embodiment of the invention.

Figure 1:
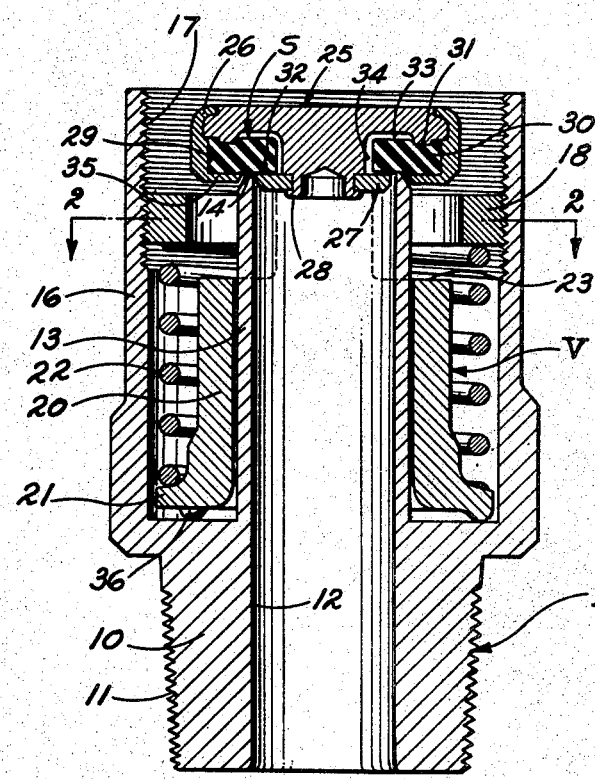
Fig. 1 is a longitudinal section through the valve member.
Figure 2:
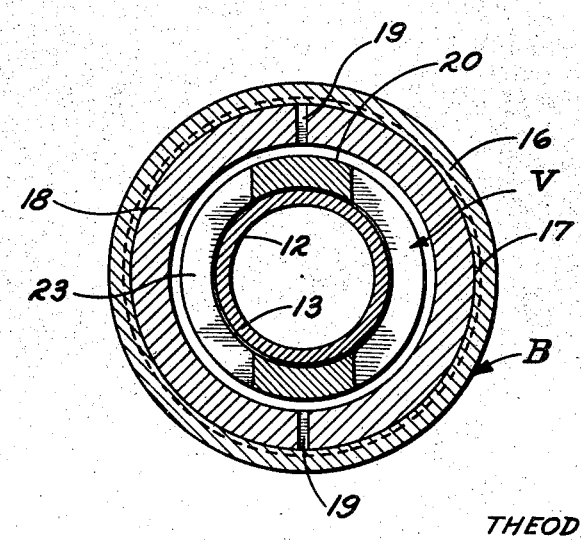
Fig. 2 is a transverse section taken on 2—2 of Fig. 1.

Referring to the drawings, my improved relief valve includes two basic parts; a body B for attachment to the pressure source, and a movable valve member V.

The body B may be attached to the pressure source by any convenient means such as the nipple 10, having tapered threads 11 formed thereon. The discharge nozzle is preferably in the form of a straight bore 12 and, in the preferred form, an outer portion of the bore 13 is in the form of a projecting sleeve terminating in a lip 14 forming the fixed or hard valve seat. Surrounding the extension 13 is a body sleeve 16, internally threaded as at 17 for receiving the adjustable spring tensioning nut 18.

The valve member V preferably includes an axially extending sleeve member 20 loosely fitting the sleeve 13, but being in guiding relationship therewith. A spring base 21 extends from one end of the sleeve 20 and receives the force of the spring 22, the other end of which engages the adjusting nut 18. The sleeve 20 is relieved at one or more places as at 23, the total area of the relieved portions being equal to, and preferably exceeding, the discharge area of the throat 12.

Secured to the upper portion of the rigid member 20 is a rigid disc 25 which cooperates with member 20 to operatively receive the soft rubber-like sealing member S. Preferably, the disc 25 is retained by a bent-over flange 26 at the outer end of the valve member, and the parts may be spun or riveted together if so desired. An inner annular abutment 27 for the sealing member S may be riveted as at 28 to the rigid disc 25.

With this construction, an annular pocket 29 is formed radially outside of the valve seat 14 which receives and confines an outer peripheral portion 30 of rubber-like sealing member S. A projection 31 on member 25 assists in confining and retaining the sealing member in place in the rigid valve member. An inner peripheral portion 32 of the sealing member S may be engaged by the inner abutment member 27, and preferably this engagement is a sealing engagement.

I prefer to form a clearance space 33 above the valve seat 14 and above the sealing engagement between the soft sealing member and the inner abutment member 27. I also provide passageway means or clearance 34, leading to the aforesaid clearance space 33. It will be noted that the flange 35 underlying the outer portion of seal S is quite close to the outer periphery of the nozzle, whereby only a small area of seal S is exposed to the atmosphere. I form the parts so that valve member V includes a stop means 36 under the spring base 21 for engagement with the valve body in response to the force of the spring, this engagement taking place after the sealing member S has been brought into light resilient engagement with the valve seat or lip 14.

In operation, with a given setting of the adjusting nut 18 corresponding to a predetermined opening pressure, as pressure rises within the orifice 12 fluid under pressure may unseat portion 32 of the seal S from the abutment 27, and by means of passageway 34 find its way to the clearance space 33.

I prefer that portion 31 be so disposed that there is a differential area above the end 14 of the nozzle equal to the annular area of the nozzle engaged by the soft seat. With this construction, as pressure in the valve body increases there is a resultant force against the upper face of sealing member S distributed over an area substantially equal to that of the engagement of the sealing member with the end of the nozzle, which force tends to augment the sealing pressure of the sealing member S against the nozzle. However, when the valve is not in use or when there is no pressure in the system to which it is connected, there is relatively little or no deforming force exerted between the end 14 of the nozzle and the sealing member S, so that there is little tendency for cold flow or creep of the sealing member S, and the effective area subject to pressure in orifice 12 remains substantially unchanged. As mentioned above, as pressure in the valve increases the unbalanced force urging sealing member S against the lip 14 increases, but the force resulting from this pressure is substantially less than spring load on the valve member due to the engagement of stop means 35. It will be noted that there is a small clearance between the outer periphery of the nozzle and the flange 35, and the portion of the seal within this clearance is the only portion not subjected to pressure. Thus seal material that tends to be displaced by indentation from the nozzle will tend to flow into this small clearance rather than into the high pressure area. However, the clearance is relatively small and flow of the seal material is virtually precluded, so that very little deformation of the seal occurs as pressure rises. Since deformation of the seal by the lip of the nozzle is negligible, the effective area subject to opening pressure remains constant as pressure in the system rises, and the opening pressure does not greatly exceed the setting pressure as in prior valves. It is noted that with the construction shown, due to the construction of the rigid annular portion 35 surrounding the nozzle and the abutment member 27 within the nozzle, there is no tendency for the escaping fluid to blow the soft sealing member S away from its normal position when the valve opens.

It has been found that the parts can be designed so that the pressure at which the valve closes closely approaches or equals that at which it opens. This is made possible by the fact that when the valve opens pressure is trapped in the clearance space 33, due to sealing with lip 27. The trapped pressure urges the portion of the sealing member S that bridges the gap between the outer annular portion 35 and the abutment member 27 to deform downwardly toward the seat 14. It will be understood that due to the venturi effect of the fluid flowing rapidly over the lip 14, the pressure locally at the lip may be less than the static pressure within the orifice 12. Thus, after the valve opens the sealing member may be urged toward the lip 14 by the trapped pressure, and effect a seal before stops 36 engage the body. Thus, the pressure at which the valve seals is higher than in the usual constructions. This action, taken in connection with the fact that the valve as described previously does not tend to deform the rubber sealing during service, causes the valve to open at the set pressure and to close substantially at the set pressure with great uniformity and consistency.

In practice, it is found that in certain installations, such as those employing liquefied petroleum gas, relatively small relief valves operating at relatively high pressure may be specified. For example, a typical installation may include a relief valve wherein the diameter of throat 12 is no more than one-half inch, and great difficulty has been experienced in the art in obtaining constant action within the specifications when such small relief valves are operated at the common pressures of 250 to 375 lbs. p. s. i. With a valve made in accordance with applicant's invention, however, the valve opens consistently at the set pressure even after it has stood for some time after the setting, and even though the pressure be relatively high and the valve relatively small, as mentioned. As a result, applicant's valve has an entirely new mode of operation in that it not only provides the effective sealing characteristic of soft-seated valves, but affords the consistency of operation characteristic of hard-seated valves.

Although applicant has illustrated a preferred form of his invention, it will be recognized that various modifications in structural details may be made thereof without departing from the mode of operation and the essence of the invention. Therefore, except insofar as they are claimed in the appended claims, structural details of the valve may be varied widely without modifying the mode of operation of the invention. Accordingly, applicant contemplates that the appended claims and not the aforesaid detailed description be determinative of the scope of the invention.

What is claimed is:

1. A relief valve comprising a valve body having a discharge orifice terminating in a relatively narrow lip forming a valve seat, a movable valve member mounted in said body, said valve member including a rigid member having an annular portion surrounding said seat and an abutment portion disposed within said seat, said valve member also including a rubber-like sealing member having its periphery fixed in said annular portion and having a free sealing portion bridging the gap between said annular and abutment portions, the under surface of said sealing portion having a sealing surface for engagement with said seat, said abutment underlying and engageable with said sealing member within said seat, said valve member being formed so that there is clearance between the rigid member and the sealing member thereof over an area above said seat and above said abutment portion, said valve member including fluid passageway means whereby pressure in said orifice and in said clearance space may be equalized, stop means on said valve member engaging said body to limit deformation of said sealing member by said lip, and resilient means urging said movable valve member against said stop means, said sealing member closing said passageway means to trap fluid under pressure in said clearance space with the valve member free of said seat.

2. A relief valve comprising a valve body having a discharge orifice terminating in a relatively narrow lip forming a valve seat, a movable valve member mounted in said body, said valve member including a rigid member having an annular portion surrounding said seat and an abutment portion disposed within said seat, said valve member also including a rubber-like sealing member carried by said annular portion and having a sealing portion bridging the gap between said annular and abutment portions, the under surface of said sealing portion having a sealing surface for engagement with said seat, said abutment having a sealing surface underlying and engageable with said sealing member within said seat, said valve member being formed so that there is clearance between the rigid member and the sealing member thereof over an area above said seat and above said abutment portion, said valve member including a fluid passageway whereby pressure in said orifice and in said clearance space may be equalized, stop means on said valve member engaging said body to limit deformation of said sealing member by said lip, and resilient means urging said movable valve member against said stop means, opening of said valve closing said passageway means from said orifice and trapping pressure in said clearance space.

3. A relief valve comprising a valve body having a discharge orifice terminating in a relatively narrow lip forming a valve seat, a movable valve member mounted in said body, said valve member including a rigid member having a first annular portion surrounding said lip and closely adjacent thereto and a second annular portion disposed within said lip and closely adjacent thereto, said valve member also including a rubber-like sealing member mounted by said first annular portion and having a freely-extending sealing portion bridging the gap between said annular portions, the under surface of said sealing portion having a sealing surface for engagement with said lip, said second annular portion having a generally axially outwardly-facing surface resiliently engaged by said sealing member, said valve member being formed so that there is clearance between the rigid member and the rubber-like sealing member thereof over an area above said lip and above said outwardly-facing surface, said valve member including fluid passageway means whereby pressure in said orifice and in said clearance space may be equalized, and stop means on said valve member engaging said body to limit deformation of said sealing member by said lip, and resilient means for urging said movable valve member against said stop means.

4. A relief valve comprising a valve body having a discharge orifice terminating in a relatively narrow lip forming a valve seat, a movable valve member mounted in said body, said valve member including a rigid member having an annular portion surrounding said seat and an abutment portion disposed within said seat, said valve member also including an annular rubber-like sealing member having a peripheral portion confined by said first annular portion and having a freely-extending portion bridging the gap between said annular and abutment portions, the under surface of said freely-extending portion having a sealing surface for engagement with said seat, said second abutment underlying and engageable with said sealing member within said seat, said valve member being formed so that there is clearance between the rigid member and the sealing member thereof over an area above said seat and above said abutment portion and between the inner periphery of said annular sealing member and said valve member, whereby pressure in said orifice and in said clearance space may be equalized, stop means on said valve member engaging said body to limit deformation of said sealing member by said seat, and resilient means for urging said movable valve member toward said stop means, said freely-extending sealing portion resiliently engaging said seat before engagement of said stop means with said body.

5. A relief valve comprising a valve body having a discharge orifice terminating in a relatively narrow lip forming a valve seat, a movable valve member mounted in said body, said valve member including a rigid member having an annular portion surrounding said seat, an abutment portion disposed within said seat, said valve member also including an annular rubber-like sealing member having a peripheral portion confined by said first annular portion and having a freely-extending portion bridging the gap between said annular and abutment portions, the under surface of said freely-extending portion having a sealing surface for engagement with said seat, said second abutment underlying and having a surface formed for sealing engagement with said sealing member within said seat, said valve member being formed so that there is clearance between the rigid member and the sealing member thereof over an area above said seat and above said abutment portion and between the inner periphery of said annular sealing member and said valve member, whereby pressure in said orifice and in said clearance space may be equalized and trapped in said clearance space with the valve open, stop means on said valve member engaging said body to limit deformation of said sealing member by said seat, and resilient means for urging said movable valve member toward said stop means.

6. A relief valve comprising a valve body having a discharge orifice terminating in a relatively narrow lip forming a valve seat, a movable valve member mounted in said body, said valve member including a rigid member having a first annular portion surrounding said lip and closely adjacent thereto and a second annular portion disposed within said lip and closely adjacent thereto, said valve member also including an annular rubber-like sealing member having a peripheral portion confined by said first annular portion and having a freely-extending portion bridging the gap between said annular portions, the under surface of said freely-extending portion having a sealing surface for engagement with said lip, said second annular portion having a generally axially outwardly-facing sealing surface resiliently engaged by an inner peripheral portion of said sealing member, said valve member being formed so that there is clearance between the rigid member and the sealing member thereof over an area above said lip and above said outwardly-facing sealing surface and between the inner periphery of said annular sealing member and said valve member, whereby pressure in said orifice and in said clearance space may be equalized and trapped with the valve open, stop means on said valve member engaging said body to limit deformation of said sealing member by said lip, and resilient means for urging said movable valve member toward said stop means.

THEODORE A. ST. CLAIR.

REFERENCES CITED

The following references are of record in the file of this patent:

UNITED STATES PATENTS

| Number | Name | Date |
|---|---|---|
| 763,208 | Robinson | June 21, 1904 |
| 1,725,297 | Paterson | Aug. 20, 1929 |
| 2,377,947 | Lewis | June 12, 1945 |
| 2,479,737 | Garretson | Aug. 23, 1949 |